United States Patent [19]

Sweeney et al.

[11] Patent Number: 5,525,371
[45] Date of Patent: * Jun. 11, 1996

[54] METHOD FOR CLEANING PARTS SOILED WITH OIL COMPONENTS AND SEPARATING TERPENES FROM OIL COMPOSITIONS WITH A CERAMIC FILTER

[75] Inventors: Eric L. Sweeney, Lakewood; C. Richard Hamilton, Arvada, both of Colo.

[73] Assignee: BioChem Systems Division, a Division of Golden Technologies Company, Inc., Golden, Colo.

[ * ] Notice: The portion of the term of this patent subsequent to Sep. 28, 2010, has been disclaimed.

[21] Appl. No.: 164,056

[22] Filed: Dec. 8, 1993

Related U.S. Application Data

[63] Continuation-in-part of Ser. No. 849,424, Jul. 10, 1992, Pat. No. 5,248,343, Ser. No. 896,210, Jun. 10, 1992, Pat. No. 5,328,518, Ser. No. 896,404, Jun. 10, 1992, Pat. No. 5,271,773, Ser. No. 914,050, Jul. 13, 1992, Pat. No. 5,421,899, Ser. No. 896,413, Jun. 10, 1992, Pat. No. 5,496,585, Ser. No. 896,239, Jun. 10, 1992, Pat. No. 5,445,680, and Ser. No. 896,686, Jun. 10, 1992, said Ser. No. 896,210, said Ser. No. 896,210, said Ser. No. 896,404, said Ser. No. 914,050, said Ser. No. 896,413, said Ser. No. 896,239, said Ser. No. 896,686, each is a continuation-in-part of Ser. No.849,424.

[51] Int. Cl.$^6$ ............................... B08B 3/04; B08B 7/04
[52] U.S. Cl. ..................... 427/327; 134/10; 134/26; 134/40; 210/651; 210/653
[58] Field of Search .................... 134/10, 26, 40; 210/651, 653; 427/327

[56] References Cited

U.S. PATENT DOCUMENTS

| | | | |
|---|---|---|---|
| Re. 29,649 | 5/1978 | Farnsworth | 252/171 |
| Re. 32,661 | 5/1988 | Binns | 252/142 |
| 2,711,978 | 6/1955 | Groom | 134/10 |
| 2,923,648 | 2/1960 | K'Burg | 134/12 |
| 3,023,144 | 2/1962 | Greathouse et al. | 167/58 |
| 3,025,190 | 3/1962 | Groom et al. | 134/10 |
| 3,094,469 | 6/1963 | Strauss et al. | 204/141 |
| 3,450,086 | 6/1969 | Maddock | 114/74 |
| 3,548,543 | 12/1970 | Evans et al. | 51/8 |
| 3,634,338 | 1/1972 | Laugle et al. | 252/525 |
| 3,951,682 | 4/1976 | Schevey et al. | 134/102 |
| 3,964,936 | 6/1976 | Das | 148/6.27 |
| 3,969,135 | 7/1976 | King et al. | 134/41 |
| 4,009,115 | 2/1977 | Binns | 252/142 |
| 4,022,688 | 5/1977 | Wikholm | 210/71 |
| 4,082,867 | 4/1978 | Henley et al. | 427/327 |
| 4,091,954 | 5/1978 | Wallace | 220/470 |
| 4,136,217 | 1/1979 | Henley | 427/327 |
| 4,270,957 | 6/1981 | Donakowski et al. | 134/2 |
| 4,336,152 | 6/1982 | Like et al. | 252/106 |
| 4,362,638 | 12/1982 | Caskey et al. | 252/90 |
| 4,379,168 | 4/1983 | Dotolo | 424/356 |
| 4,414,128 | 11/1983 | Goffinet | 252/111 |
| 4,445,813 | 5/1984 | Misra et al. | 413/1 |
| 4,452,264 | 6/1984 | Kreisel et al. | 134/58 |
| 4,477,290 | 10/1984 | Carroll et al. | 148/6 |
| 4,498,934 | 2/1985 | Potts | 134/254 |
| 4,506,533 | 3/1985 | Hessel et al. | 72/42 |
| 4,511,488 | 4/1985 | Matta | 252/162 |
| 4,537,640 | 8/1985 | Kreisel et al. | 134/18 |
| 4,540,505 | 9/1985 | Frazier | 252/106 |
| 4,599,116 | 7/1986 | King et al. | 134/2 |
| 4,620,937 | 11/1986 | Dellutri | 252/143 |
| 4,640,719 | 2/1987 | Hayes et al. | 134/40 |
| 4,654,089 | 3/1987 | Singelyn et al. | 134/26 |
| 4,692,251 | 9/1987 | Hilgren | 210/651 |
| 4,704,225 | 11/1987 | Stoufer | 252/153 |
| 4,749,516 | 6/1988 | Brusky | 252/546 |
| 4,767,563 | 8/1988 | de Buzzaccarini | 252/174 |
| 4,790,951 | 12/1988 | Frieser et al. | 252/162 |
| 4,797,231 | 1/1989 | Schumann et al. | 252/547 |
| 4,798,218 | 1/1989 | Sauvan | 134/74 |
| 4,846,976 | 7/1989 | Ford | 210/651 X |
| 4,865,742 | 9/1989 | Falletti | 210/637 |
| 5,059,331 | 10/1991 | Goyal | 210/748 |
| 5,110,473 | 5/1992 | Hassett | 210/651 X |
| 5,207,917 | 5/1993 | Weaver | 210/651 |
| 5,244,566 | 9/1993 | Bond | 134/40 X |
| 5,248,343 | 9/1993 | Hamilton et al. | 134/10 |
| 5,269,933 | 12/1993 | Jehle et al. | 210/651 X |
| 5,271,773 | 12/1993 | Hamilton et al. | 134/10 |
| 5,300,154 | 4/1994 | Ferber et al. | 134/26 |
| 5,328,518 | 7/1994 | Hamilton et al. | 134/10 |

FOREIGN PATENT DOCUMENTS

| | | |
|---|---|---|
| 2636149 | 3/1977 | Germany . |
| 2713516 | 9/1978 | Germany . |
| 2026551 | 5/1978 | United Kingdom . |
| 1603047 | 11/1981 | United Kingdom . |
| 2143254 | 2/1985 | United Kingdom . |

*Primary Examiner*—Jan H. Silbaugh
*Assistant Examiner*—Saeed Chaudhry
*Attorney, Agent, or Firm*—Sheridan Ross & McIntosh

[57] ABSTRACT

A method is provided for cleaning parts soiled with oil components and separating terpenes from oil compositions using filters having suitable pore sizes to allow terpene components to pass through the walls of the filter as a permeate while not allowing oil components to pass therethrough. A separate aspect of the present invention utilizes a ceramic filter capable of separating water components from a mixture of terpenes and oil, thus allowing filtered water to be reused in a cleaning procedure. Using both types of filters in one operation provides a substantially closed loop recycling system where terpene components can be reused to clean additional articles, water can be reused to rinse such articles and contaminants removed in the cleaning process can be either reused or disposed of.

10 Claims, 4 Drawing Sheets

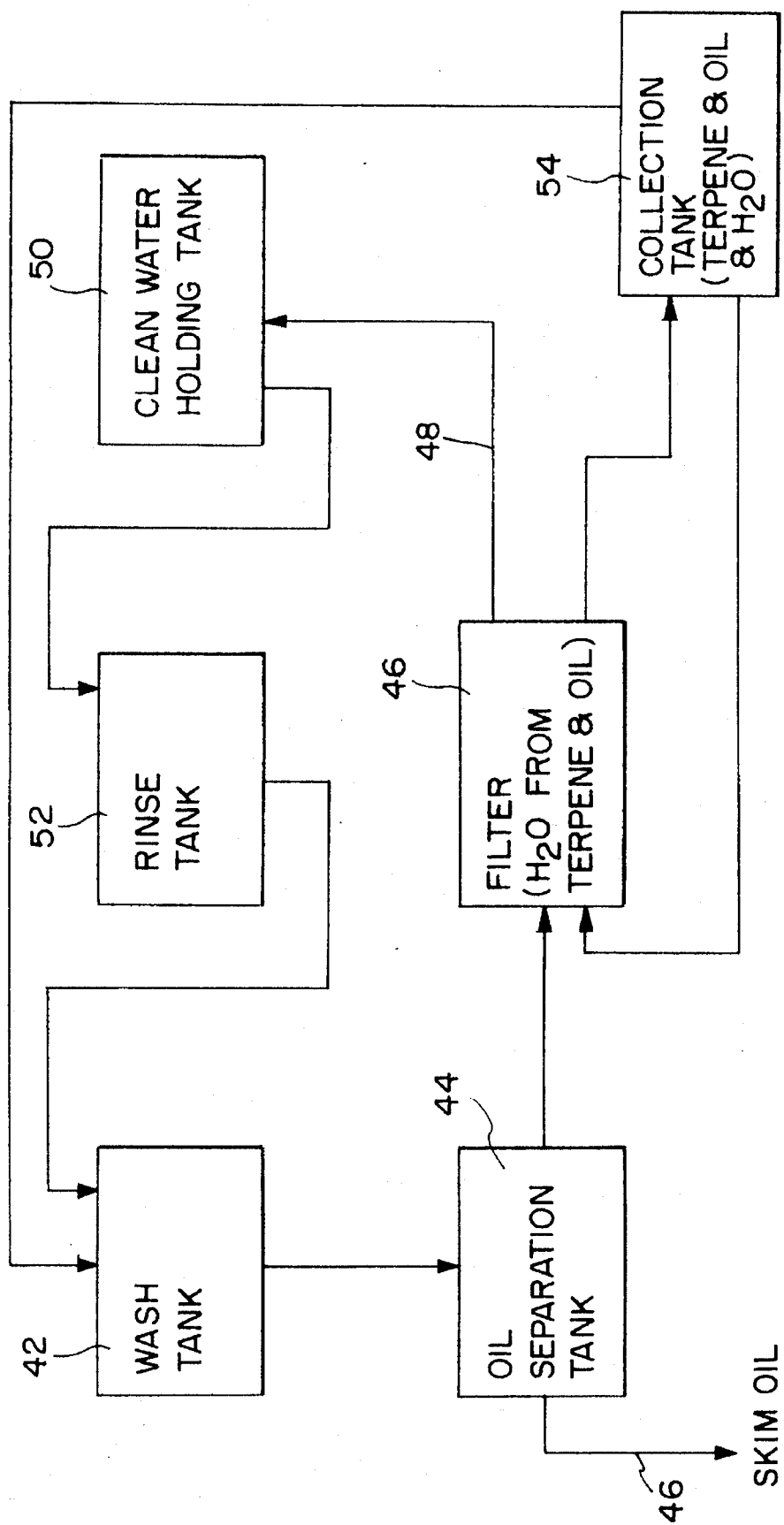

METHOD FOR CLEANING PARTS SOILED WITH OIL COMPONENTS AND SEPARATING TERPENES FROM OIL COMPOSITIONS WITH A CERAMIC FILTER

REFERENCE TO RELATED APPLICATIONS

This application is a continuation-in-part of U.S. application Ser. No. 07/849,424, filed Jul. 10, 1992, U.S. Pat. No. 5,248,343 which is a national phase of Patent Cooperation Treaty Application Ser. No. US91/09310 filed Dec. 6, 1991 having priority based upon U.S. application Ser. No. 07/624,140 filed Dec. 7, 1990 now abandoned. This application is also a continuation-in-part of U.S. application Ser. Nos. 07/896,210 filed Jun. 19, 1992, U.S. Pat No. 5,328,518, 07/896,404 filed Jun. 10, 1992, U.S. Pat. No. 5,271,773, 07/914,050 filed Jul. 13, 1992, U.S. Pat. No. 5,421,399, 07/896,413 filed Jun. 10,1993, U.S. Pat. No. 5,499,535, 07/896,239 filed Jun. 10, 1992, U.S. Pat. No. 5,445,680 and 07/896,686 filed Jun. 10, 1992, all of which are continuation-in-part applications of U.S. application Ser. No. 07/849,424 filed Jul. 10, 1992 U.S. Pat. No. 5,248,343. All of the preceding patent applications are incorporated herein by reference.

FIELD OF THE INVENTION

This invention relates to a method and apparatus for separating terpenes from oil compositions and more particularly to a process whereby a filter is used to separate terpene cleaning compositions from oils. In another embodiment, the present invention is directed to a method and apparatus for concentrating a terpene and oil composition when used in a aqueous cleaning system and to separate aqueous components from other terpene and oil components.

BACKGROUND OF THE INVENTION

In many areas of industry there is a need for a cleaning method and apparatus capable of removing oil components from articles of manufacture. For example, cleaning is often required of motors, food processing machines, other metal, ceramic, plastic and painted surfaces that may become soiled with oily components and adhesive residues. Specifically, in the manufacture of articles, such as metal articles, it is common for oil-based compositions to be used as lubricants, forming oils and/or coolants during the manufacturing process. It is frequently necessary to clean such manufactured articles of the oil-based compositions prior to subsequent steps, such as coating or decorating the surfaces of the article. Commonly, such manufacturing oils are cleaned with either acidic or caustic solutions, chlorinated solvents or petroleum based cleaners and subsequently rinsed with water for cleaning. Such cleaning processes have a number of disadvantages including, health hazards and hazards in handling acidic or caustic solutions, the need for treatment and disposal of used wash solutions to comply with environmental regulations prior to their discharge, and damage caused to the articles being cleaned.

The use of nonhazardous, nontoxic, noncorrosive biodegradable cleaning products would be preferable over the many industrial cleaning solvents currently in use. It has been recognized in related applications that terpene-based cleaning compositions are particularly advantageous for cleaning oil-based compositions from manufactured articles. For example, in specific processes, such as the manufacture of cans, it has been found that terpene-based cleaning compositions cause significantly less etching when compared with acidic or caustic wash solutions. Such reduced etching results in highly improved reflectivity of containers, increased mobility of articles on conveyor lines, the ability to recycle various liquid streams in the cleaning system, and the ability to use decreased amounts of coatings necessary to decorate or protect cleaned articles.

A problem encountered in terpene-based cleaning systems is that to recycle the cleaning solution, contaminants which have been removed from articles must be separated from the contaminated cleaning solution prior to recycling and reuse of the cleaning solution. However, it has been found that many terpene-based cleaning systems do not allow for the efficient and effective separation of contaminants from cleaning agents and compositions. Moreover, the separation of water that has been mixed with oils and/or cleaning agents is necessary to enable such water to be reused, as well as to concentrate undesired contaminants for economical disposal.

A method and apparatus is required to facilitate the effective and economical separation of terpene cleaning agents from oils, and to facilitate the recycling of liquid streams, particularly aqueous streams and terpene cleaners used in the cleaning processes.

SUMMARY OF THE INVENTION

The present invention is directed to a method for removing water insoluble contaminants from article surfaces using terpene cleaning agents and separating and recycling the contaminants and cleaning agent components. In one embodiment, a method is provided for separating terpenes from oil compositions by filtering a mixture of terpenes and oil contaminants through a filter having pore sizes sufficient to allow terpene components to pass therethrough while not allowing passage of oil contaminants. Filter pore sizes range from between about 50 Å and about 7,500 Å and preferably between about 200 Å and 500 Å. Suitable filters are constructed of ceramic, polypropylene and polyacrylnitrile materials, or mixtures thereof, but ceramic is most preferred. The separation of terpene cleaning agents from removed oils allows for increased use and recycling of cleaning agents and fosters the protection of the environment.

Another aspect of the present invention is directed to a method for cleaning contaminated articles in which wash and rinse solutions and mixtures thereof are filtered to separate water from organic components, including terpene cleaning agents and removed oil contaminants. Such filters have pore sizes as small as 4 Å but preferably have pore sizes of between about 200 Å and 1000 Å due to the ability of organic components to form large emulsions that are incapable of passing through such larger pores. In this aspect of the invention, water is separated, reused in the rinse or wash stages, the cleaning agent is separated and reused in the wash stage, and contaminants are separated for reuse or disposal.

Among the several advantages derived from use of the present invention is the reduction in the roughness average of surfaces cleaned using the present invention, thus providing for smoother, more reflective cleaned surfaces. An unexpected advantage of the reduced roughness average of cleaned surfaces is the ability to coat such surfaces with protective and/or decorative coatings by using up to one-third less coating than would otherwise be required if an acidic or caustic cleaning agent were utilized. Moreover, the enamel rater reading (ERR) values for metal containers finished using the present invention have been shown to be significantly better than ERR values of containers cleaned using conventional acidic and caustic cleaning agents. Finally, the amount of total volatile organic compounds generated through the use of the present invention are reduced as compared to conventional cleaning operations, due primarily to the reduction in coating usage required to effectively coat cleaned surfaces.

BRIEF DESCRIPTION OF THE FIGURES

FIG. 4 is a schematic diagram showing one embodiment of the present invention in which water is recycled for use in the rinsing and washing of contaminated articles and where terpene cleaning agents are concentrated for reuse in the cleaning of additional soiled articles.

DETAILED DESCRIPTION OF THE INVENTION

Figure 1:
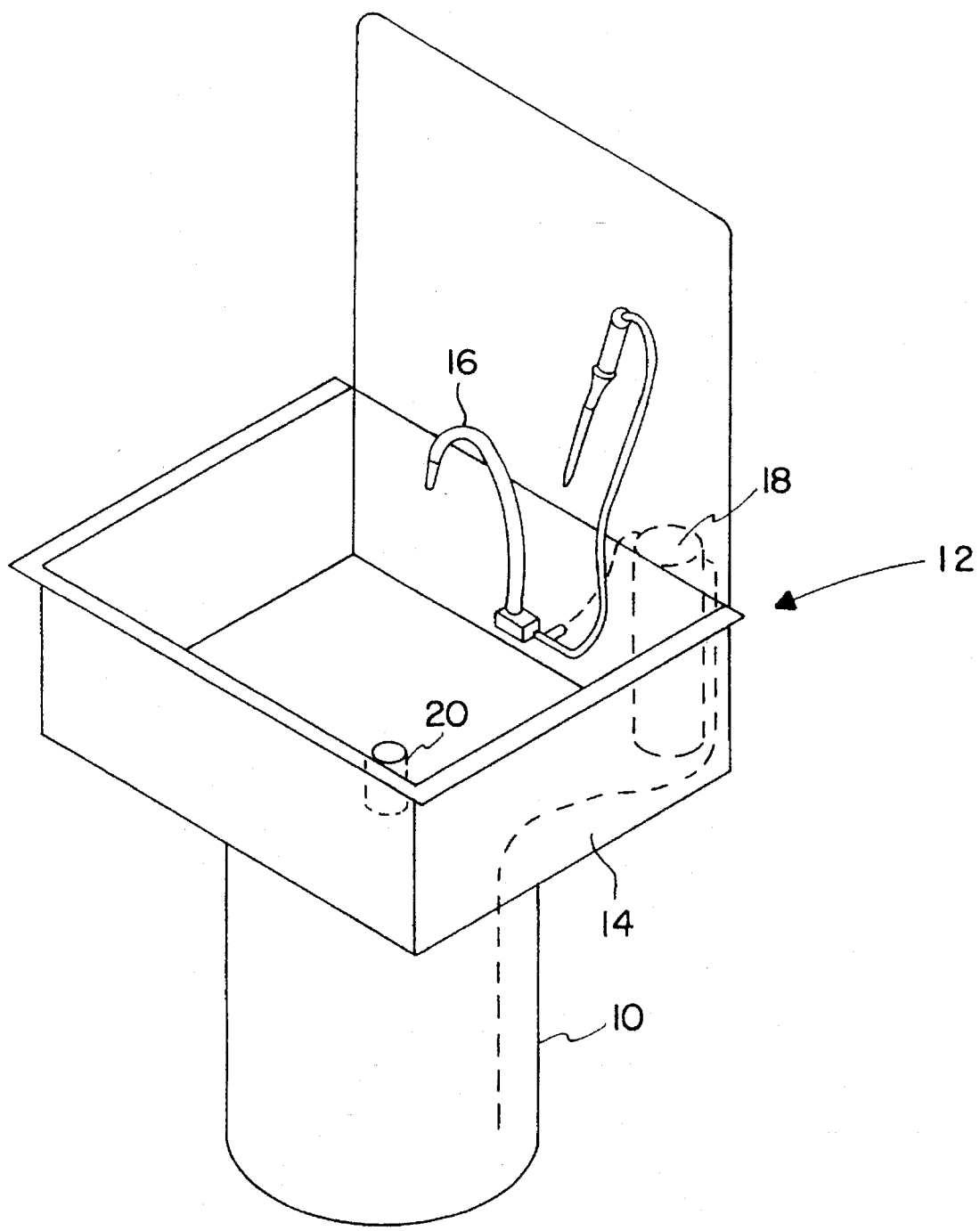
FIG. 1 shows a parts washer device in which soiled parts (not shown) are contacted with a terpene cleaning agent and the resulting cleaning agent/oil component solution is thereafter collected.

The present invention generally relates to a method for cleaning articles, and more particularly relates to the separation of terpene cleaning agents from oil contaminants, as well as the separation of aqueous components from cleaning agent and oil solutions. Filters, preferably comprising ceramic materials, are utilized to achieve separation of desired components, thus facilitating the recycling and concentration of various fractions used in a cleaning system.

As used herein, articles refers to any feedstock, goods in process, or finished products. Such articles can be made of any material including, without limitation, metal, ceramic, fiberglass, plastic and wood. Metal articles can include, but are not limited to, any article having a metal surface, including aluminum, steel, brass, copper or alloys thereof, such as parts of automobiles, airplanes, railroad cars, metal components used in high technology industries, computer and calculator face plates, containers, precision metal parts, shiny metal components (e.g., doorknobs), and other manufactured metal articles. The term container, as used herein, refers to, but is not limited to, beverage cans, food containers and other containers such as aerosol cans and oil filters.

The present process and apparatus are particularly useful for articles having metal parts which are thin, such as metal parts which are less than about 0.010", more preferably less than about 0.0070", and even more preferably less than about 0.0040". Such thin metal parts, if etched by conventional acid or caustic wash solutions, can have holes etched completely through the metal parts. The present process invention is therefore suitable for use in conjunction with metals that are susceptible to etching by typical cleaning solutions such as acidic or caustic washing solutions. In particular, aluminum, including treated aluminum, magnesium, including treated magnesium, tin-free steel, steel, copper and copper alloys are particularly susceptible to etching. The present invention is suitable for use in cleaning articles which are manufactured by any type of drawing process in which metal starting material is shaped by drawing the metal with various forming parts such as a die. Such drawn surfaces are particularly susceptible to etching because they may undergo gouging during the drawing process which provides a site for etching to occur. In a general sense, the present method is useful for cleaning articles in a manner so as to avoid the etching and pitting that occurs when using cleaning agents that do not have a substantially neutral pH, such as conventional acidic and caustic cleaning agents.

The articles cleaned using the present invention have increased reflectivity and a lower roughness averages as compared to articles cleaned in conventional systems using conventional cleaners. For example, articles cleaned using the present system have a lower roughness average (Ra) (e.g., below about 6 Ra as measured on the outside diameter of metal containers), than articles cleaned with acidic or caustic cleaning agents.

Another advantage of the present invention is that less coating is required to either protect or decorate a particular surface cleaned using the present method. Specifically, in using the present invention, the amount of coating necessary to cover a surface is reduced by up to as much as one-third when compared to the amount of coating that would be necessary to cover the same surface if such surface were cleaned using conventional acidic and caustic cleaners. It has been found that the amount of coating necessary to coat a surface cleaned using the present method is reduced by at least about 18% as compared to the amount of coating needed to coat surfaces cleaned with acidic or caustic cleaning agents. It is believed that the reduced amount of coating necessary to cover a surface after such surface is cleaned using the present method is achieved by the reduction in surface area due to the absence of etching of the article's surface.

As used herein, contaminants refers to any water insoluble organic substance, particularly a petroleum-based or synthetic organic compound, that is deposited on an article's surface. Water insoluble substances, as used herein, refers to any substance that is not substantially dispersible in water at the molecular or ionic level, and is alternatively hereinafter referred to as "oils." Such water insoluble substances are therefore not effectively removed from a surface by water alone. Contaminants typically will be lubricants and/or coolants, such as forming oils, cutting oils, mill oils, and anti-rust oils, which are commonly composed of petroleum products, pitch, tar, adhesive residues, gum, tree sap, paint, ink, latex, esters, diesters and/or fatty acids. Contaminants cleaned from surfaces using the present invention include those that are synthetic in origin, including polyglycols, fatty acids, ethers including polyphenyl ethers, and esters, including diesters, triesters and tetraesters and including phosphate esters, dibasic acid esters, silicate esters, and neopentyl polyol esters. Metal coil stock for making metal articles, such as containers, for example, is frequently contacted with a number of oils to protect, cool or lubricate the surface of the metal.

Preferred contaminants are contaminants having a well-defined lower molecular weight value such that a molecular weight distribution of the contaminants does not go substantially below a given molecular weight. In this manner, effective filtration of components can be achieved, as discussed below. Thus, preferred contaminants include synthetic oils having a well-defined molecular weight range or petroleum-based oils having a well-defined molecular weight fraction. In a preferred embodiment, the contaminant is an oil with a molecular weight of at least about 300 and more preferably above about 500. In a preferred embodiment of the invention, the contaminant comprises a petroleum fraction having a minimum chain length of 20 carbon atoms, more preferably a minimum chain length of 35 carbon atoms, and more preferably a minimum chain length of 50 carbon atoms.

Contaminants having a low molecular weight or a broad molecular weight distribution including low molecular weight species can pass through the pores of certain filters, such as certain cross-flow filters, resulting in poor filtration of water and/or cleaning agent. In contrast, preferred contaminants having a well-defined lower molecular weight value greater than the relevant pore size of a filter typically will not pass through the filter's pores.

Two particular types of filters are useful in the present invention: One to separate terpene cleaning agents from oil contaminants; and another to separate water from other materials, including terpene cleaning agents and organic oils. The present invention therefore utilizes various filters and filtering techniques to separate desired fractions, particularly either terpene cleaning solutions or aqueous solutions, from oil contaminants.

Preferred filters for use in the present invention are cross flow filters. As used herein, a cross-flow filter refers to a device that separates components in a pressurized feed stream moving parallel to a filter membrane. Such filters can be made of any suitable material, including ceramic, metal, paper, and various forms of plastics, such as polypropylene, polyacrylnitrile, and surface treated plastics. In cross-flow filtration, molecules or emulsions below a desired size pass through the membrane walls. Molecules above a desired size are substantially incapable of passing through the membrane walls and thus pass through the hollow core of the filter.

In one preferred embodiment, the filters used are made of a ceramic material. Ceramic material is preferred for filter construction since filters constructed from plastic material, for instance, can be degraded and/or plugged by oil contaminants filtered therethrough. In addition, ceramic filters are more sturdy in their construction and therefore have high pressure back flushing capabilities that do not exist with other types of filters. Preferably, the filters used in the present invention have back flush pressure capabilities of at least about 10 psi, more preferably above about 100 psi, and even more preferably up to about 1000 psi. In contrast, conventional polymer filters used in water purification systems, for example, are incapable of withstanding back flush pressures of over about 10 psi.

While various filters can therefore be utilized for the present invention, a particularly preferred embodiment involves the use of a ceramic filter having a particular pore size structure allowing for the separation of desired components, such as terpene cleaning agents and/or aqueous solutions, including substantially pure water, from mixed organic containing solutions. To accomplish desired filtration of components in a mixed solution, filters are selected with pore sizes sufficient to only allow the passage of permeate of below a specified and pre-determined molecular weight and/or size. For example, to separate a terpene cleaning agent from an oil contaminant, a pore size sufficient to permit passage of the terpene cleaning agent having a molecular weight of approximately 130–200 would be preferred (i.e., pore sizes of between about 50 Å and 500 Å). In selecting an appropriate filter for use in the present invention, various parameters should be considered, including the size of molecules or emulsions present in a liquid steam to be filtered. Commercially available filters suitable for use in the present invention have pore sizes ranging from about 4 Å to about 7500 Å and can be obtained from Coors Ceramics, U.S. Filter, and Millipore.

In the processing of aqueous solutions where it is desirable to separate water from oils and emulsions, filters are selected having pore sizes able to preclude carbon black, oils and cleaning agents from passing through the filter and contaminating the water permeate. Filters having pore sizes of between about 4 Å and 500 Å, more preferably between about 4 Å and 200 Å, and most preferably between about 4 Å and 40 Å, can be used to separate aqueous components from terpene and oil contaminants where emulsions are not encountered, and especially when less than about 1000 ppm total organic is present in a water, terpene or oil mixture. In situations where it is desired to separate water from a concentrated terpene and oil emulsion, the pore size can be in the range of about 100 Å to 8000 Å, more preferably between about 200 Å to about 1000 Å and most preferably between about 200 Å to about 500 Å. Such pore sizes permit water to permeate through the filter without substantial contamination of the permeate by emulsions formed by interaction of cleaning agents, surfactants and oil contaminants.

In using the present method to separate water from terpene cleaning agent components and oil components, the filter has a pore size sufficient to permit water to pass through the pores without permitting the emulsion to pass therethrough, such emulsion formed by molecular interactions between surfactants, terpene cleaning agents, water and oil contaminants. Preferably, the amount of surfactants used in a terpene cleaning composition should be sufficient to form an emulsion that does not pass through the filter's pores. Use of an excess amount of surfactant should be avoided, however, because effective separation of oil components from terpene cleaning agent would not be facilitated. As such, in a preferred embodiment of the present invention where an aqueous cleaning solution is to be filtered, surfactants should be present in an amount of below about 10% by volume, and preferably about 6% by volume.

Filters used in the present invention are typically of a tube-like or channeled construction and are capable of handling a flow-through rate of at least about 10 gallons per minute and a permeate flow rate of at least about 0.08 gallon per minute. "Flow-through rate" refers to the rate at which liquids pass through the hollow core of a filter, as opposed to the "permeate flow-through rate" which refers to the rate at which a permeate passes through the filter barrier. In situations where increased filtering capacity is desired, additional filter tubes or channels can be utilized to increase the rate of filtering. In one particular embodiment, a filter housing having approximately 19 separate filter tubes is utilized to provide a flow-through rate of approximately 200 gallons per minute and a permeate flow rate of about 1.5 gallons per minute. In this particular embodiment, the filter is approximately one meter long. As will be appreciated by those skilled in the art, various sizes and designs of appropriate filters can be selected for particular uses keeping in mind necessary pore sizes, flow rates, back flushing requirements, etc. to accomplish a particular filtering operation.

The practical consideration in filter selection is dictated by the amount and quality of permeate desired. For example, use of a single filter having a pore size of 200 Å is capable of generating a water permeate of high quality (e.g., water having less than about 100 ppm organic) when adequate pump pressure is supplied. In multi-filter configurations significantly more pressure is required to achieve desired permeate qualities and quantities. There is a limit to how much pump pressures can be increased, however, before permeate quality begins to deteriorate (i.e., become contaminated with undesired agents forced through filter pores). Increased pump pressure can also generate undesired sheer forces that act to degrade permeate quality. As such, in aqueous systems in which terpene cleaning agents, surfactants and oil components are present, care should be taken in the selection of a pump to insure that emulsions are not broken down to an extent that filter pores can be clogged or emulsions sheered to an extent that undesired components pass through the filter.

Preferred filters have a ratio of flow-through rate to permeate flow rate of less than about 100 to 1, and more preferably about 50 to 1. The quality of water resulting from the filtering of an aqueous terpene and oil component solution should not contain more than about 1000 ppm organic, more preferably less than about 500 ppm organic, and most preferably less than about 100 ppm organic.

Filters can be constructed and/or modified to achieve a particular pore size by applying specified coatings to the filtering surface. The smaller the pore size the more resistance is achieved through the filter, thus reducing the rate of permeate flow through the filter. To achieve desired levels of permeate quality and purity, filters having pore sizes sufficient to permit desired amounts of permeate to pass therethrough in a predetermined period of time are selected. The number of filters used in any particular embodiment is subject to economic considerations in view of desired permeate flow rates.

The cleaning agent of the present invention comprises a terpene or terpene mixture in an amount effective for particular cleaning applications. Terpenes have the general chemical formula of $C_{10}H_{16}$ and are based on the isoprene unit $C_5H_8$. The term terpene includes terpene derivatives or terpenols as well as monocyclic, bicyclic, polycyclic or acyclic terpenes. Preferred terpene compositions of the present invention include d-limonene, alpha-terpineol, beta-terpineol, alpha-pinene, beta-pinene, alcohols of such terpenes or mixtures thereof.

The concentration of terpene in a cleaning agent depends upon the particular application but must generally be effective to obtain acceptable cleaning levels of contaminants from articles and to obtain acceptable separation of terpenes from oils removed in the cleaning process. Specifically, the percentage of terpene agents used in one embodiment of the invention is at least about 95% by volume, excluding other wetting agents, surfactants and emulsifiers, and in such concentration, is particularly useful in non-aqueous cleaning operations. In aqueous cleaning operations, however, the combination of surfactants, terpene cleaning agents and oil contaminants should be sufficient so that an emulsion forms which is substantially incapable of passing through filter pores. As illustrated in the examples below, a terpene cleaning composition having approximately 6% surfactant by volume was found to be particularly useful in aqueous cleaning operations. Too much surfactant in a terpene composition may result in the inability of the terpene cleaning agent to separate from oil contaminants removed in the cleaning process, thus defeating desired recyclability capabilities of the present invention.

One aspect of the present invention relates to a non-aqueous cleaning system in which a terpene agent is used. While one embodiment of the present invention preferably utilizes substantially pure terpene compositions, terpene compositions may also include surfactants used in conjunction with the terpene to facilitate rapid wetting of the surface of the article to be cleaned and/or to facilitate the emulsification of organic components. Any suitable surfactant or mixtures of surfactants can be used and they can be nonionic, anionic, cationic, or amphoteric, and of natural or synthetic origin. A surfactant/terpene cleaning agent solution should preferably be comprised so that the filtering of such solution will permit effective separation of contaminants removed in the cleaning process. Suitable surfactants for use in the present invention include, but are not limited to, nonylphenol, alkanolamide, (nonylphenoxy)polyethylene oxide, sodium salts of petroleum sulfonic acid, sorbitan sesquioleate, or mixtures thereof. Specific suitable surfactants include surfactants sold under the commercial designation Tergitol NP-7 by Union Carbide Corporation and WRS-1-66 sold by Cyclo-Corporation of Miami, Fla. Tergitol NP-7 is a nonionic nonylphenol with an ethoxylated seven carbon chain. WRS-1-66 is a nonionic alkynolamide consisting of oleic acid DEA and DEA oleate.

In one embodiment, the process of the present invention includes contacting an article contaminated with water soluble or water insoluble contaminants with a terpene-based solution. Any conventional technique may be employed to contact the solution with the contaminated article. For example, contact can be accomplished by spraying, showering or immersing the article in the cleaning solution. Appropriate contacting times, pressures, and solution volumes can be determined for particular applications.

As illustrated in FIG. 1, the present process can be conducted in a batch process whereby an operator contacts articles contaminated with contaminants with a terpene-based solution and collects the resulting terpene-based contaminant solution in a containment reservoir 10. A parts washer 12 is provided having an area 14 within which parts (not shown) are placed for cleaning. Below the parts washing cleaning area 14 is a collection reservoir or container 10 capable of holding cleaning agent and oils removed from soiled parts (not shown) during the cleaning process. Associated with the parts washer 12 is a means for contacting 16 soiled parts with the cleaning agent, such means including a spray nozzle, an immersion tank or a brush applicator.

In one embodiment of the present invention, the parts washer 12 is capable of recirculating a cleaning agent/oil component mixture through a filter 18 to thereby separate solids and some of the oil component from the cleaning agent. The cleaning agent should preferably be cleaned to a point where it is effective in removing additional oils from soiled parts. The filter 18 used with the present system is preferably capable of being changed on a periodic basis dependent upon the amount of use. The filter 18 can be constructed of any suitable material, preferably either a fabric, plastic or ceramic filter that can be cleaned and reused and/or easily replaced.

The parts washer used with the present system preferably has a particulate filter 20 capable of retaining particulate matter washed from soiled parts of defined sizes prior to the cleaning agent/oil component mixture being collected in the collection receptacle 10. In one embodiment a screen 20 is placed in the bottom of the parts washer to accomplish such filtering.

One of the particular advantages of a non-aqueous embodiment of the present invention is that soiled parts can be cleaned without utilizing any water rinse. As such, polluted water disposal problems are eliminated. The present invention provides a substantially self-contained system that permits the reuse of a set volume of a cleaning agent in the cleaning of numerous soiled parts. The present invention therefore provides a cleaning system that extends the cleaning life a particular cleaning agent, thus enhancing the environmental recycling of previously disposed of agents while avoiding water pollution consensus.

Contaminants which are recovered using the present process can be recycled for further use in a manufacturing process. It has been found that cleaning with a terpene-based cleaning system does not degrade contaminants. As such, unlike the contaminants that are contacted with conventional acidic, caustic, chlorinated or petroleum agents, contaminants that are contacted with terpene cleaning agents can be recycled and used in subsequent manufacturing processes, or blended with other suitable lubricants and/or coolants for further use.

Figure 2:
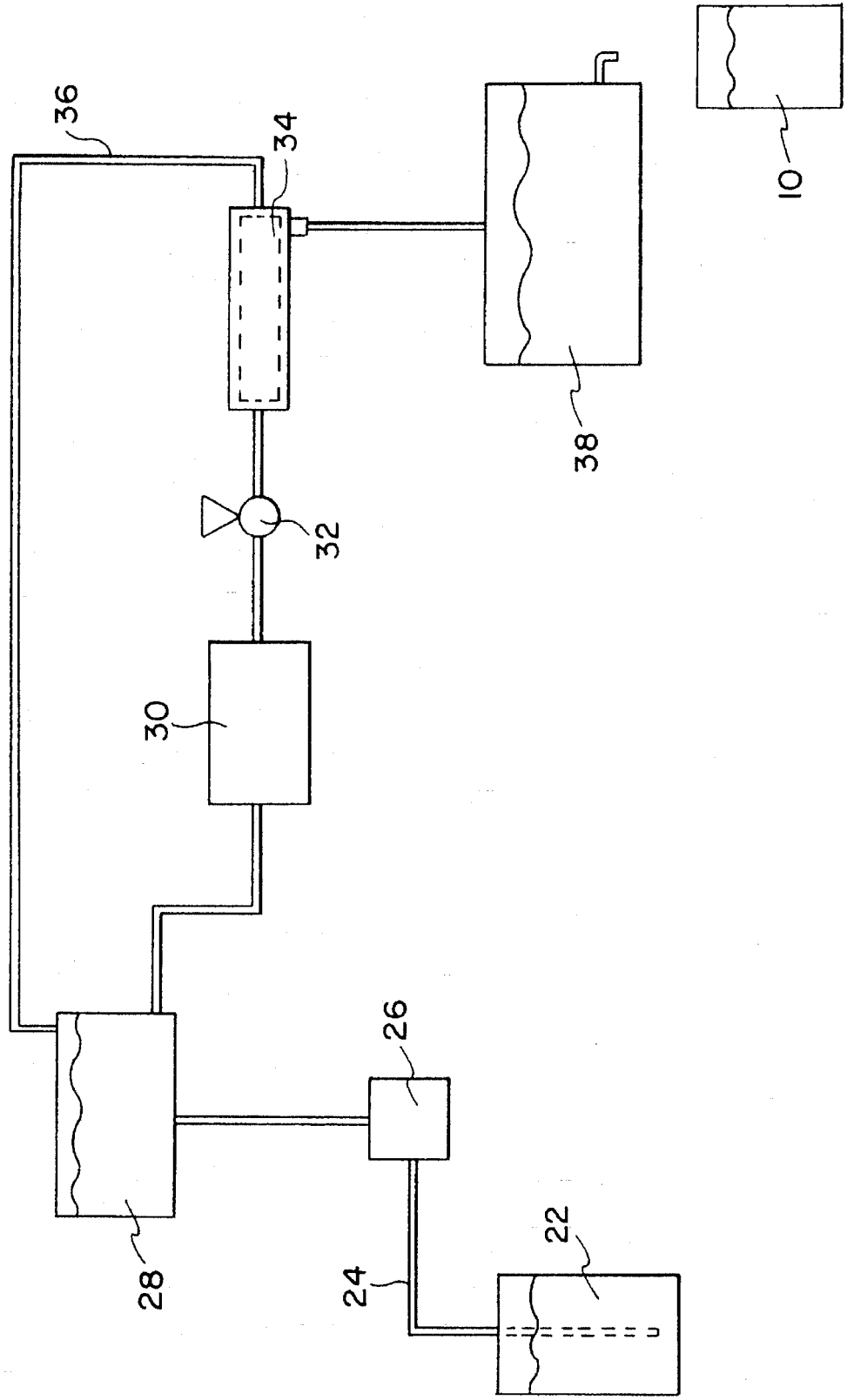
FIG. 2 shows a process for conveying a contaminant/cleaning agent solution through a ceramic filter that is capable of separating oil contaminants from the cleaning agent.

The process of the present invention includes the separation and recycling of the terpene cleaning agent and removed contaminants resulting from the cleaning of soiled parts. As shown in FIG. 2, after contaminants and the terpene cleaning agent are collected in a collection container 22, the content of the container 22 is removed through a removal hose 24 and directed through a particulate filter 26 to remove any particulate matter. The mixed solution of contaminants and cleaning agent is then directed to a feed tank 28 where it is allowed to collect until further processing is desired. When a desired amount of the mixed solution is collected, the contaminant and cleaning agent solution is directed through a heat exchanger 30 to cool the solution to a desired temperature. A suitable heat exchanger 30 for use in the present invention can include an air cooled device, a water cooled device, a refrigerator or other cooling unit that is effective in reducing the temperature of the mixed solution to below at least about the boiling point or the flash point of the mixed solution, more preferably below the flash point of terpene (i.e., approximately 130° F.). The cooled contaminant/cleaning agent solution is then directed to a pump 32 which transports the mixed solution through a filter 34 at a desired pump volume. A low shear pump is preferably used to reduce the amount of heat generated in the mixed solution. Suitable pumps can include centrifugal pumps and bellow pumps. A pump 32 should be selected that provides a pressure drop of approximately 30 trans-membrane pressure (TMP). TMP is measured by relating the input of a filter to the output of the filter, and it corresponds to the pressure of permeate passing through the filter. Trans-membrane pressure is defined as the inlet pressure plus the outlet pressure divided by two, minus the permeate pressure, if any. Typically, the TMP of a filter system used in the present invention is between about 5 and about 60, more preferably between about 10 and about 50, and more preferably between about 15 and about 40.

Selection of a pump 32 that creates too much pressure is not advantageous because back pressure created by the inability of flow to pass through a filter could negatively affect the TMP and undesired contaminants can thus be forced through the filter 34 creating contaminated permeate and filter clogging problems. In one preferred embodiment, where a 19 tube filter 34 is utilized to separate terpene cleaning agent from oil contaminants, a pump 32 is used that has a pump volume of at least about 200 gallons per minute. Scale up of engineering can obviously be performed to accommodate the handling of larger volumes of solution and hence, the size, number and design of filters and pumps can be modified to suit particular needs and applications.

In one particular embodiment of the present invention, a preferred ceramic filter 34 through which the contaminant/cleaning agent solution is conveyed has a pore size sufficient to permit a terpene-based permeate to pass therethrough while precluding the passage of contaminants through the filter's pores. Contaminants are therefore transported through the hollow core of the ceramic filter 34 and are directed through a return line 36 back to the feed tank 28. The terpene solution passing through the pores of the ceramic filter 34 (permeates) are directed to a holding tank 38 where concentrated terpene cleaning agent is collected for further use in the cleaning of additional soiled parts. The holding tank is therefore used to fill additional collection containers 10 for further use in conjunction with a parts washer 12.

It will be appreciated that one of the advantages of the present invention is the ability to concentrate contaminants so as to reduce the volume of material that may need to be disposed of. For instance, without use of the present method, a mixed solution of terpene cleaning agent and contaminants would have to be disposed of, such disposal costs largely dependent upon the volume of disposed material. Using the present invention, both contaminants and terpene cleaning agents are separated and thus, concentrated in a form capable of being reused or disposed of separately in an appropriate manner.

Figure 3:
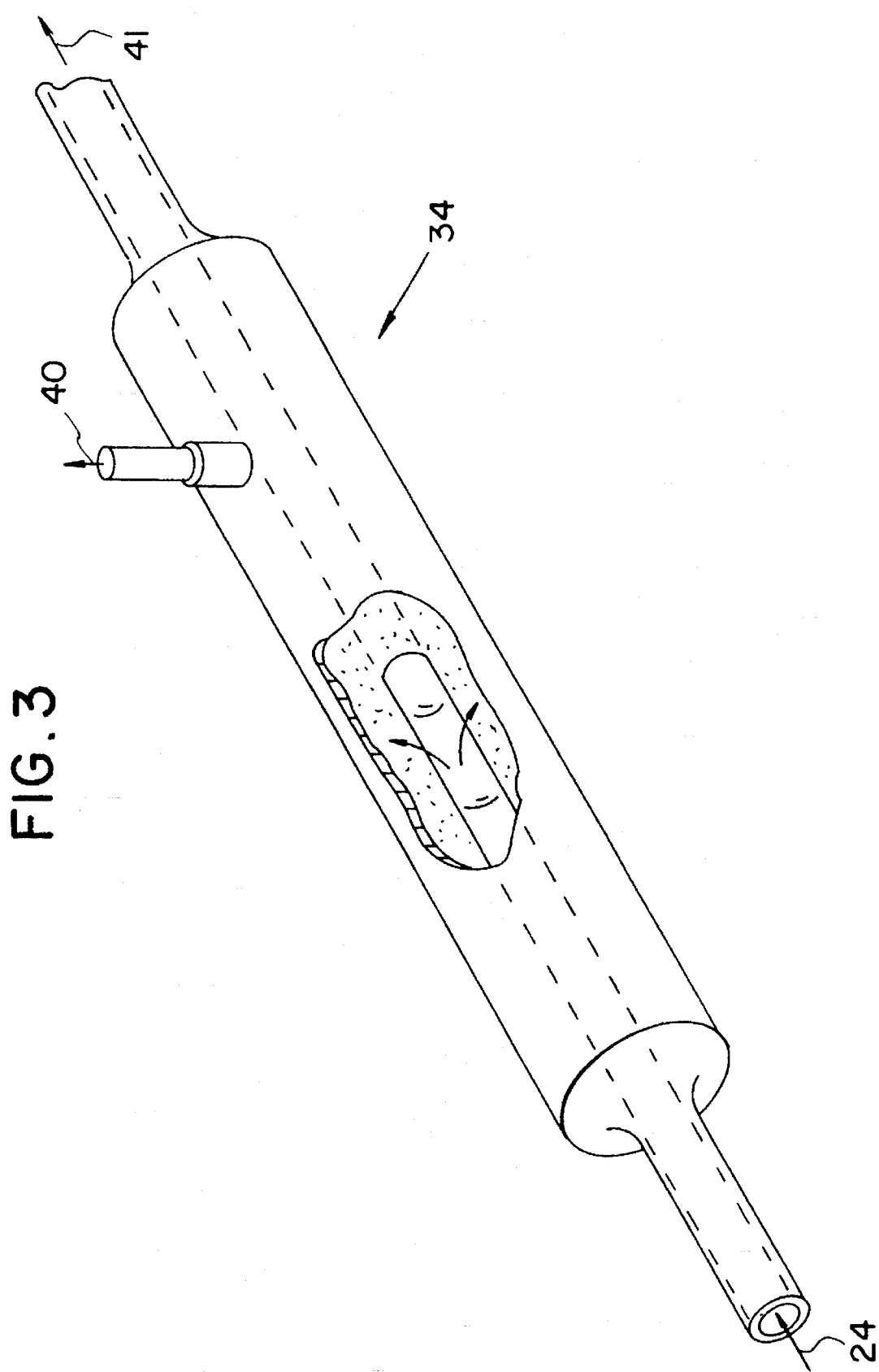
FIG. 3 shows one embodiment of a ceramic filter useful in the present invention to separate terpenes from oil contaminants and in separating water from organic emulsions.

In one embodiment of the present invention, as shown in FIGS. 2 and 3, a solution 24 comprising a mixture of contaminants and terpene cleaning agent is pumped through a filter 34, preferably a ceramic filter. Suitable ceramic filters 34 include those having a multi-tube design. Use of increased number of tubes, in view of other process conditions, generally allows for a greater volume of contaminants and terpene cleaning agent to be filtered, and thus the number and type of pumps, piping, filters, pump volumes, pore sizes, etc., can influence the rate at which separation can be achieved. The collection of a permeate 40 through such a filter system is the desired objective, such permeate 40 in a non-aqueous embodiment of the present invention, comprising a substantially pure terpene cleaning agent (i.e., at least about 95% by volume). The remaining solution passing through the core of the filter 34 is recirculated through the system to achieve desired separation.

A separate aspect of the present invention involves the separation of aqueous components from water insoluble components using a filter system. Specifically, the separation of water from a terpene/oil contaminant mixture is conducted by using a filter 34 that has appropriate pore sizes so as to permit primarily water to pass through the filter walls as a permeate, while allowing the terpene/oil emulsion contaminant components to pass directly through the core of the filter. In this manner, it is possible to provide water substantially free of terpenes and oil contaminants.

As shown in FIG. 4, soiled articles (not shown) can be washed in a wash tank 42. The wash tank contents, comprising water, terpene cleaning agent and oil contaminants is directed to an oil separation tank 44. Oils that separate from the aqueous solution can be skimmed 46 from the top of the separation tank 44 if so desired. After skimming of oil from the surface of the separation tank 44, the remaining solution is directed to a filter 46 which is capable of separating water as a permeate from the terpene/oil contaminant component of the wash tank solution. The water 48 separated by the filter 46 is conveyed to a clean water holding tank 50. The water 48 in such holding tank can be used in the rinsing of additional contaminated articles (not shown). As such, water 48 from the clean water holding tank 50 is sprayed or otherwise contacted with washed articles and such water is collected in a rinse tank 52.

The terpene/oil contaminant component resulting from the separation of water from the original wash tank solution is conducted to a batch collection holding tank 54. The batch holding tank 54 collects substantially concentrated terpene solution having a relatively small amount of oil contaminants therein. The contents from the batch holding tank 54 can be transported back to the wash tank 42 and used to clean additional soiled articles. By recycling not only the terpene in the wash solution, but also the water in the rinse and/or wash solutions, the present invention provides for an essentially closed loop system with respect to the components of the rinse and/or wash solutions.

In conjunction with the present invention, a hood (not shown), exhaust stack and stack condenser and/or a vapor particle mister (preferred when organic solvents like terpenes are used) can be placed over the washing 42 and rinsing stages 52 described herein to control the amount of volatile organic compounds released during these stages. The amount of VOC's released can vary dependent upon several factors including the type and design of stack and exhaust blowers used, the temperature of solutions and the flow rate at which the system is operated. In a preferred embodiment, terpene emissions can be captured by a hood and condensed by a stack condenser placed within an exhaust stack having a flow rate of about 250 ft$^3$/minute.

From the foregoing discussion, a number of advantages attendant to the present process are apparent. Because the present invention allows for efficient separation of both cleaning agents and contaminants from contaminated wash solutions, a cleaning system can be conducted in a substantially closed and continuous fashion.

The following examples are provided for the purpose of illustration and are not intended to limit the scope of the invention.

EXAMPLE I

This example illustrates the separation of water from a terpene cleaning agent and oil component composition. Thirty-eight ceramic filter tubes having a pore size of approximately 500 Å was used to filter a stream of 300B formulation terpene cleaning agent, such formulation having approximately 6% surfactant by volume. Specifically, the cleaning composition used was a 10% solution of 93 volume percent d-limonene, 6 volume percent Tergitol NP-7, and 1 volume percent wrs-1-66. A pump was used to create a permeate flow-through rate through the thirty-eight filter tubes of about six gallons per minute. The flow-through rate of solution passing through the filter's core was approximately 300 gallons per minute. The water filtered as a permeate had less than 100 parts per million of organic therein. In contrast, the solution prior to filtering contained approximately 100,000 parts per million organic.

EXAMPLE II

This Example compares containers washed with a standard acid wash to containers washed according to the present invention with respect to the roughness average of the surfaces of the containers. The containers washed in accordance with the present invention have a smoother surface with increased reflectivity as indicated by measurements of roughness. Table 1 below compares the average roughness of containers washed in accordance with the present invention and containers washed using a standard acid wash. Two aluminum containers were analyzed by a scanning electron microscope and a Rank Taylor Hobson Profilometer to determine the difference in surface roughness of the outside and inside diameters of each container.

A 10 volume percent terpene composition was used in which the finishing agent included 93 volume percent d-limonene, 6 volume percent Tergitol NP-7 and 1 volume percent WRS-1-66. A roughness average is the universally recognized and most used international parameter of the roughness of a surface. A roughness average is the arithmetic mean of the departures of the profile line produced by a profilometer from the mean line given by the following equation.

$$Ra = 1/L_0 \int^L y(x)/dx \qquad [1]$$

where
L=measurement length
$_0\int^L$=integral from 0 to L
y=peak heights
x=period of integration

TABLE 1

COMPARISON OF Ra VALUES BETWEEN ACID AND TERPENE WASHED CONTAINERS

| Wash | Roughness Average |
|---|---|
| Terpene Composition Wash | (Inside Diameter) 5.6 Ra |
| Acid Wash | (Inside Diameter) 12.5 Ra |
| Terpene Composition Wash | (Outside Diameter) 2.2 Ra |
| Acid Wash | (Outside Diameter) 6.0 Ra |

Table 1 indicates that containers washed with the terpene finishing agent produce a container about two to three times smoother than containers washed in a standard acid wash.

EXAMPLE III

This Example illustrates that containers treated in accordance with the present invention have better coating coverage characteristics for a given amount of coating than containers washed with conventional caustic washes.

A source of 12 ounce aluminum containers were produced in a conventional container bodymaker using coolants and a synthetic lubricant having the composition identified in Table 2.

TABLE 2

| Lubricant Composition | |
|---|---|
| | Volume % |
| tetraester[1] | 86 |
| S-MAZ 80[2] | 6 |
| BRIJ-30[2] | 4 |
| Mazon 224-86[2] | 2 |
| Mazon RI 6[3] | 2 |

[1]The tetraester is an ester prepared by esterification of a 10–30 carbon saturated fatty acid with a pentaerythritol.
[2]S-MAZ 80, BRIJ-30 and Mazon 224-86 are commercially available surfactants from Mazer Chemical.
[3]Mazon RI 6 is a commercially available anti-rust component from Mazer Chemical.

A first group of forty containers produced as described above were washed in a 140° F. wash of a conventional caustic cleaner available from Amchem-Parker and identified as Amchem-Parker Can Washing Caustic Cleaner. After washing, the containers were thoroughly rinsed with water. A second group of forty containers produced as described above were finished with a 10% solution of 97 volume percent d-limonene, 6 volume percent Tergitol NP-7, and 1 volume percent WRS-1-66 at a wash solution temperature of 140° F. After washing, the containers were thoroughly rinsed with water. A third group of forty additional containers were finished with a 10 volume percent d-limonene solution, as described above, with a wash solution temperature of 120° F. The wash solution for this third group of containers started gelling and became the consistency of hand cream. The experiment was stopped and the bath was allowed to sit overnight during which time it liquified. The next day, a fourth group of forty containers were washed in the same 10 volume percent d-limonene based finishing solution at 120° F. This fourth group of containers had been allowed to sit overnight after manufacture and before cleaning. As noted below, the poor results obtained with this fourth group of containers are believed to be due to the containers not being finished immediately after manufacture, thus allowing lubricants and coolants to dry on the surface of the containers and preventing complete washing of the surface.

After finishing the containers, all four groups of containers were coated on the interior of the containers with a water-based epoxy coating available from Glidden having 20 volume percent solids, 64 volume percent water, and 16 volume percent volatile organic compounds. Each container was coated with 85 milligrams of the epoxy-based resin. After curing of the composition, each container was tested for the ability to conduct a current through the coating on the interior of the container using an enamel rater reading apparatus. In this test, a 1% sodium chloride solution is placed in the container and an electrode is placed in the sodium chloride solution. A second electrode is contacted to the outside of the container and a current is passed between the two electrodes. A higher current indicates a poorer coating because it indicates a reduced insulating ability of the coating. Thus, for a constant volume of coating applied to the containers (85 milligrams), a lower current indicates better coverage. The results are shown below in Table 3.

TABLE 3

COMPARISON OF ERR VALUES BETWEEN TERPENE-BASED AND CAUSTIC-BASED FINISHING SOLUTIONS AT CONSTANT COATING AMOUNTS

| Group # | Wash | Temperature (degrees Fahrenheit) | Average ERR (milliamps) |
|---|---|---|---|
| 1 | Caustic | 140 | 68 |
| 2 | Terpene | 140 | 13 |
| 3 | Terpene | 120 | 17 |
| 4 | Terpene | 120 | 73* |

*This value is believed to be inaccurate because the containers which formed the basis of this value sat overnight after manufacture and before cleaning with the terpene-based solution, thus allowing lubricants and coolants to dry and harden.

This Example illustrates that, for a given amount of coating, containers finished with a terpene finishing agent have significantly better ERR values. This Example also shows that to obtain a given ERR value, a reduced amount of coating is required when metal containers have been finished with a terpene finishing agent.

EXAMPLE IV

This Example illustrates that containers treated in accordance with the present invention have better coating coverage characteristics for a given amount of coating than containers washed with conventional caustic washes.

A source of 12 ounce aluminum containers were produced in a conventional container bodymaker using the commercially available coolants and a synthetic lubricant Quaker 990 AB lubricant and Bodymaker DTI 5600 coolant. A first group of 350 containers produced as described above were washed in a 140° F. wash of a conventional caustic cleaner available from Amchem-Parker and identified as Amchem-Parker Can Washing Caustic Cleaner. After washing, the containers were thoroughly rinsed with water. A second group of 350 containers produced as described above were cleaned with a 10% solution of 93 volume percent d-limonene, 6 volume percent Tergitol NP-7, and 1 volume percent WRS-1-66 at a wash solution temperature of 120° F. After washing, the containers were thoroughly rinsed with water. A third group of 350 additional containers produced as described above were cleaned with a 5 to 8 volume percent d-limonene solution in water, without surfactants with a wash solution temperature of 120° F.

After cleaning, all three groups of containers were coated on the interior of the containers with a water-based epoxy coating available from Glidden having 20 volume percent solids, 64 volume percent water, and 16 volume percent volatile organic compounds. Each container was coated with 99 milligrams of the epoxy-based resin. After curing of the composition, 48 containers from each group were tested for the ability to conduct a current through the coating on the interior of the container using an enamel rater reading apparatus. In this test, a 1% sodium chloride solution is placed in the container and an electrode is placed in the sodium chloride solution. A second electrode is contacted to the outside of the container and a current is passed between the two electrodes. A higher current indicates a poorer coating because it indicates a reduced insulating ability of the coating. Thus, for a constant volume of coating applied to the containers (99 milligrams), a lower current indicates better coverage. The results are shown below in Table 4.

TABLE 4

COMPARISON OF ERR VALUES BETWEEN TERPENE-BASED AND CAUSTIC-BASED FINISHING SOLUTIONS AT CONSTANT COATING AMOUNTS

| Group # | Wash | Temperature (degrees Fahrenheit) | Average ERR (milliamps) |
|---|---|---|---|
| 1 | Caustic | 140 | 87.5 |
| 2 | Terpene | 120 | 3.0 |
| 3 | Terpene | 120 | 1.7 |

This Example illustrates that by cleaning containers with a terpene finishing agent, for a given amount of coating, significantly better coverage can be obtained as measured by ERR values. Alternatively, to obtain a given ERR value, lower amounts of coatings would be needed in the case of terpene-based cleaned containers.

EXAMPLE V

A test was performed to compare the amounts of interior and exterior coating required to sufficiently coat the inner and outer surfaces, respectively, of metal containers washed with a standard acid wash and metal containers washed with the terpene finishing agent described above. About 60,000 containers were washed and coated in accordance with the present invention and the average weight of coating required to attain sufficient coverage (i.e., visually equivalent tone and color to those containers treated with a standard acid wash) was recorded. The results are shown in Table 5.

TABLE 5

COMPARISON COATING AMOUNTS USED ON ACID AND TERPENE WASHED CONTAINERS

|  | Terpene Wash Average Coating (mg/container) | Acid Wash Average Coating (mg/container) |
|---|---|---|
| Exterior Coat | 122 | 190 |
| (Ink + Exterior Coat) Interior Coat | 135 | 165 |

As demonstrated by these results, there is a significant reduction in the amount of interior and exterior coat required to coat a container washed with a terpene finishing agent compared with a container washed with an acid wash. It was found that 37% less exterior coat was required and 18% less interior coat was required to coat containers treated with a terpene finishing agent compared with those treated with an acid wash.

While various embodiments of the present invention have been described in detail, it is apparent that modifications and adaptations of those embodiments will occur to those skilled in the art. However, it is to be expressly understood that such modifications and adaptations are within the scope of the present invention, as set forth in the following claims.

What is claimed is:

1. A method for cleaning parts soiled with oil components, comprising:

contacting parts having oil components thereon with a terpene to effectively remove said oil components from said part and to produce a mixed solution comprising terpene and oil components;

collecting said mixed solution in an oil separation tank; and conveying said mixed solution through a ceramic filter having a pore size of about 100 Å to about 8000 Å and capable of separating terpene from said oil components wherein said filter has pores of a size sufficient to allow said terpene to pass therethrough without allowing passage of substantial amounts of said oil components.

2. The method as set forth in claim 1, wherein said filter has a pore size of at least 200 Å.

3. The method as set forth in claim 1, wherein said separated terpene is recycled for use as a cleaning agent.

4. The method as set forth in claim 1, further comprising coating said parts after said contacting step with a protective or decorative coating, wherein at least one-third less coating is necessary to coat said part as compared to substantially identical parts finished using an acidic or caustic cleaning agent.

5. The method as set forth in claim 1, wherein said parts cleaned in accordance with said method have a roughness average that is less than the roughness average of parts cleaned using an acidic or caustic cleaning agent.

6. The method as set forth in claim 1, wherein said parts cleaned in accordance with said method have a roughness average of less than 6 Ra.

7. The method as set forth in claim 1, wherein said parts cleaned in accordance with said method are containers and said containers have ERR values that are less than ERR values of containers cleaned with acidic and caustic cleaning agents.

8. The method as set forth in claim 1, wherein said filter has a pore size of at least 1,000 Å.

9. A process for recycling a terpene cleaning agent used to clean a surface having oil components thereon comprising:

applying a tarpane cleaning agent to an article soiled with oil components;

removing said terpene cleaning agent and oil components from said article;

collecting a mixture of said oil components and terpene cleaning agent; and filtering said terpene cleaning agent from said oil components, wherein said step of filtering comprises conveying said terpene cleaning agent and contaminant mixture through a ceramic filter having a pore size of about 100 Å to about 8,000 Å and wherein said filter has pores of a size sufficient to allow said terpene to pass therethrough without allowing passage of substantial amounts of said oil components.

10. The process as set forth in claim 9, wherein said article is made of a substance selected from the group consisting of metal, ceramic, fiberglass, plastic and wood.

* * * * *